United States Patent [19]
Kamiyama et al.

[11] Patent Number: 5,264,969
[45] Date of Patent: Nov. 23, 1993

[54] TAPE EDITING APPARATUS WITH AUTOMATIC TRACKING ADJUSTMENT PRIOR TO RECORDING

[75] Inventors: Kazuo Kamiyama; Norio Tanaka; Takato Narita, all of Kanagawa, Japan

[73] Assignee: Sony Corporation, Tokyo, Japan

[21] Appl. No.: 865,952

[22] Filed: Apr. 9, 1992

[30] Foreign Application Priority Data

Apr. 12, 1991 [JP] Japan .................. 3-106494

[51] Int. Cl.⁵ .............. G11B 27/029; G11B 15/52
[52] U.S. Cl. .......................... 360/14.2; 360/73.13; 360/72.1
[58] Field of Search .............. 360/73, 14.2, 27, 71, 360/72.1, 73.02, 73.11, 73.13

[56] References Cited

U.S. PATENT DOCUMENTS

| | | | |
|---|---|---|---|
| 3,600,508 | 8/1971 | Dann et al. | 360/73.11 |
| 3,772,468 | 11/1973 | Tatsuguchi | 360/73.11 |
| 4,179,712 | 12/1979 | Opelt | 360/13 |
| 4,210,943 | 7/1980 | Nakamura et al. | 360/73.11 |
| 4,463,391 | 7/1984 | Takano et al. | 360/10.2 |
| 4,510,535 | 4/1985 | Tokumitsu | 360/73.11 |
| 4,602,298 | 7/1986 | Nishitani et al. | 360/14.2 |
| 4,698,702 | 10/1987 | Miyake | 360/33.1 |
| 4,772,966 | 9/1988 | Sharples et al. | 360/71 |
| 4,901,166 | 2/1990 | Kojima | 360/14.1 |
| 4,989,101 | 1/1991 | Sasho | 360/72.1 |
| 5,088,077 | 2/1992 | Lamoine | 360/73.02 |

Primary Examiner—Edward P. Westin
Assistant Examiner—Benjamin D. Driscoll
Attorney, Agent, or Firm—Limbach & Limbach

[57] ABSTRACT

A recording/reproducing apparatus with an editing function delivers a control command to a tape running servo through a system controller of a system control system at the time of phase adjustment, thus to control a capstan motor. At this time, servo status information is delivered from the capstan motor to the system controller through the tape running servo. Whether or not adjustment of tracking is completed is judged in accordance with the above information to automatically carry out adjustment of tracking, thereby making it possible to automatically conduct, at the time of editing, adjustment of tracking, which was carried out by manual operation prior to editing work, without supplementing a new circuit.

4 Claims, 3 Drawing Sheets

TAPE EDITING APPARATUS WITH AUTOMATIC TRACKING ADJUSTMENT PRIOR TO RECORDING

BACKGROUND OF THE INVENTION

1. Field of the Invention

This invention relates to a tape editing apparatus having automatic tracking adjustment.

2. Description of the Related Art

When editing of a video tape in recent years, so called electronic editing to entirely electrically carry out editing without cutting the video tape is frequently adopted.

For such an electronic editing, it is required that at least two VTR (Video Tape Recorders) are used to wind or take up (so called a preroll) tapes of respective VTRs at a position forward of the editing point where editing is carried out, and thereafter to carry out a so called phase adjustment to adjust phase of respective regenerative signals of these VTRS, i.e., the phase of a control signal, the phase of a drum revolution, and the like. As such an electronic editing method, a method called an automatic editing is also known.

A tape editing apparatus based on such an electronic editing method having the ability to carry out automatic editing comprises in combination a plurality of Video Tape Recorders (VTRs), a controller (or computer), and associated equipments. As video tape recorders included in the tape editing apparatus, there are provided a video tape recorder for recording and a video tape recorder for reproduction. The operating procedure of the tape editing apparatus is conducted as follows. First, the operations of a plurality of video tape recorders are controlled on the basis of editing information input in advance into the controller (or computer). A video tape recorder corresponding to the editing source of the automatic tape editing apparatus provides necessary regenerative signals while suitably selecting them.

In the case of carrying out an automatic tracking adjustment in a typical automatic editing, the algorithm of the tape editing apparatus function adapted for carrying out a tracking automatic adjustment in the time period from when phase adjustment is carried out until the start of recording is as follows. When a command indicative of starting automatic editing is input preroll is conducted thereafter to allow the Edit Preset and the Play to be in an "ON" state. When both the Edit Preset and the Play have completely placed in "ON" state, the tape editing apparatus starts phase adjustment.

The editing function reproduces at an editing point an objective or target recorded program, etc. to record the reproduced content onto an editing point (cut-in point) located at an objective or target position on a recording tape. The above mentioned phase adjustment is an operation or manipulation for allowing the video tape recorders to be precisely started for editing at respective points (cut-in points) on the basis of time codes recorded on the respective tapes. For such a time code, there are two time codes of a VITC (Vertical Interval Time Code) for recording into a recording area in the helical direction and a LTC (Longitudinal Time Code) for recording in the length direction.

In order to carry out phase adjustment between at least two video tape recorders, one of the video tape recorders carries out variable speed reproduction so as to start editing on the basis of time codes that respective objective or target editing points (cut-in points) indicate by input ("ON" state) of a variable speed reproduction command (Var). If the phase adjustment operation by the variable speed reproduction which is the editing start pre-processing is completed, the tape editing apparatus allows the play command (Play) to be in "ON" state. Then, tracking adjustment is carried out by monitoring the RF envelope of a video signal.

Then, it is determined whether or not a servo lock is established in the tape running servo. In the case where the servo lock is not established, it is determined whether or not the above-mentioned operation should be repeatedly carried out and operation corresponding to the determined result is carried out. In contrast, in the case where the servo lock is established, a control command (Edit) for editing is caused to be placed in an "ON" state, thus to start the editing work from the editing point (cut-in point).

This automatic tape editing apparatus has, in addition to the above-mentioned function, a function to precisely and promptly carry out various operations such as high speed selection of cut of a material to be connected, determination of its leading position thereof and preset of a recording position of a master tape, etc. to conduct a desired editing.

However, in the case where the above-mentioned automatic tape editing apparatus is used to carry out an automatic tracking adjustment, it was necessary to operate buttons an operation panel manually for a time period until starting of recording at the time of phase adjustment, i.e., to adjust tracking until the cut-in point so that the tracking level becomes maximum. For this reason, prior to editing work using this apparatus, an editor had to consciously carry out tracking adjustment by a manual operation at the time of phase adjustment. While the tracking adjustment operation at the time of phase adjustment permits an editor to precisely automatically carry out a very fine editing after the tracking phase adjustment is satisfactorily carried out, in the event that an editor has forgotten this manual operation, there is high possibility that tracking errors may take place, resulting in noise on the picture. For this reason, the tracking adjustment at the time of an initial phase adjustment becomes very important. However, since it is necessary to carry out a manual tracking adjustment operation at the time of an initial phase adjustment, this would impose a burden on the editor.

OBJECT AND SUMMARY OF THE INVENTION

With the above described actual circumstances in view, an object of this invention is to provide a tape editing apparatus capable of automatically carrying out a tracking adjustment at the cut-in point serving as the editing start point, without the need for the editor to consciously carry out such a tracking adjustment by a manual operation prior to editing work at the time of editing, thus to minimize tracking errors.

The tape editing apparatus with automatic tracking adjustment, according to the invention comprises a phase adjustment circuit that operates during forward movement of the tape prior to the start of recording during editing. The phase adjustment circuit adjusts a phase to a predetermined value. The phase is the phase between a control signal reproduced from a recording tape and a control signal reproduced from a reproducing tape. The apparatus further comprises a tracking adjustment circuit for automatically carrying out a tracking adjustment in a time period from the time when the phase adjustment has been carried out until the start of recording. Finally, the apparatus includes a circuit for providing status information indicating when the tracking adjustment has been completed. When the tracking adjustment has not been completed by the start of recording, the circuit causes the phase adjustment circuit and the tracking adjustment circuit to repeat their operations until the tracking adjustment is completed. This automatically adjusts tracking at the cut-in point during editing, and minimizes tracking errors.

In accordance with the tape editing apparatus according to this invention, manual tracking adjustment prior to editing work becomes unnecessary, thus making it possible to greatly lessen burden on the editor. By using such an apparatus, it is possible to carry out editing free from tracking deviations at all times.

DETAILED DESCRIPTION OF THE PREFERRED EMBODIMENT

Figure 1:
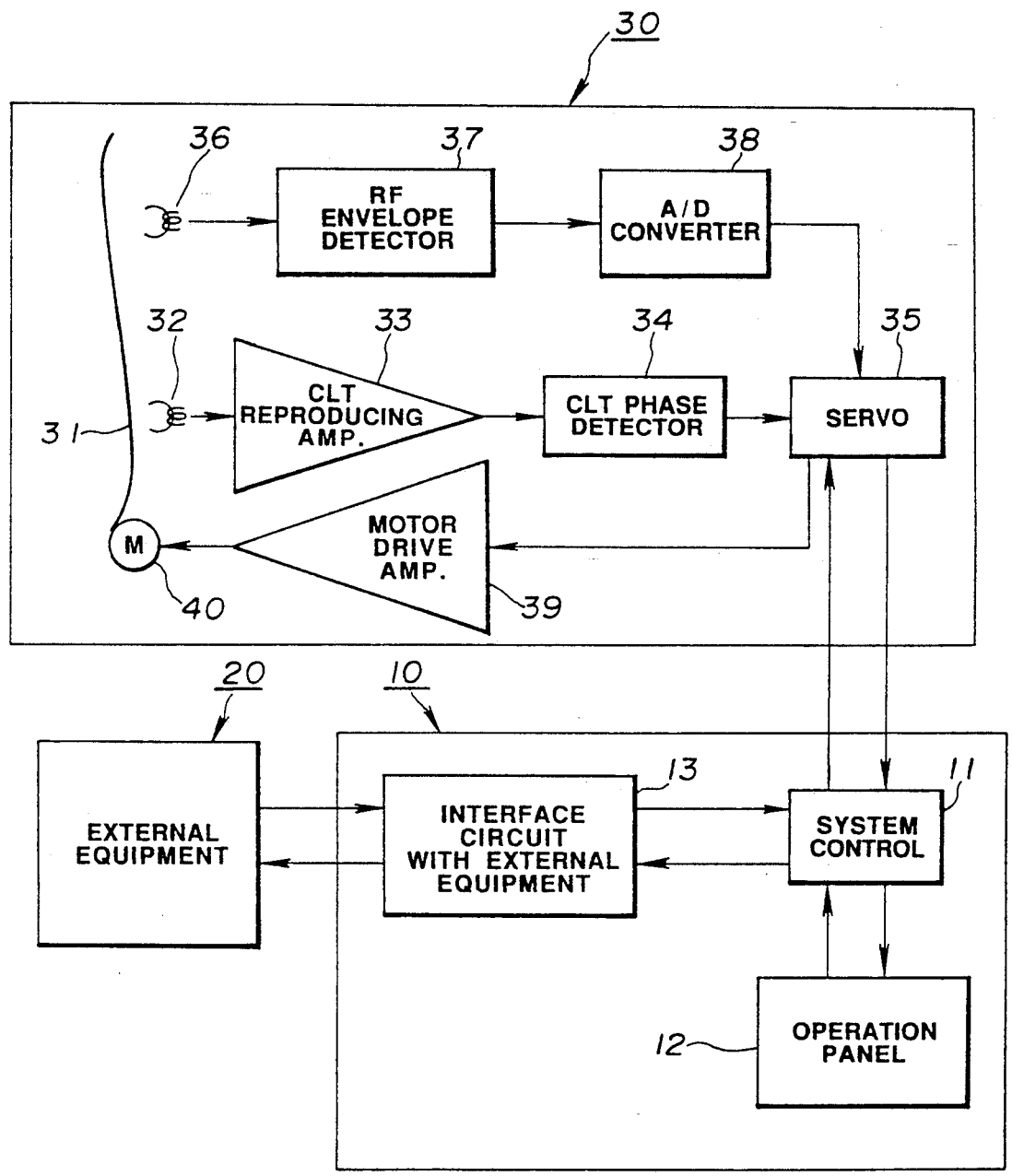
FIG. 1 is a block diagram schematically showing the entirety of a tape editing apparatus according to this invention.
Figure 2:
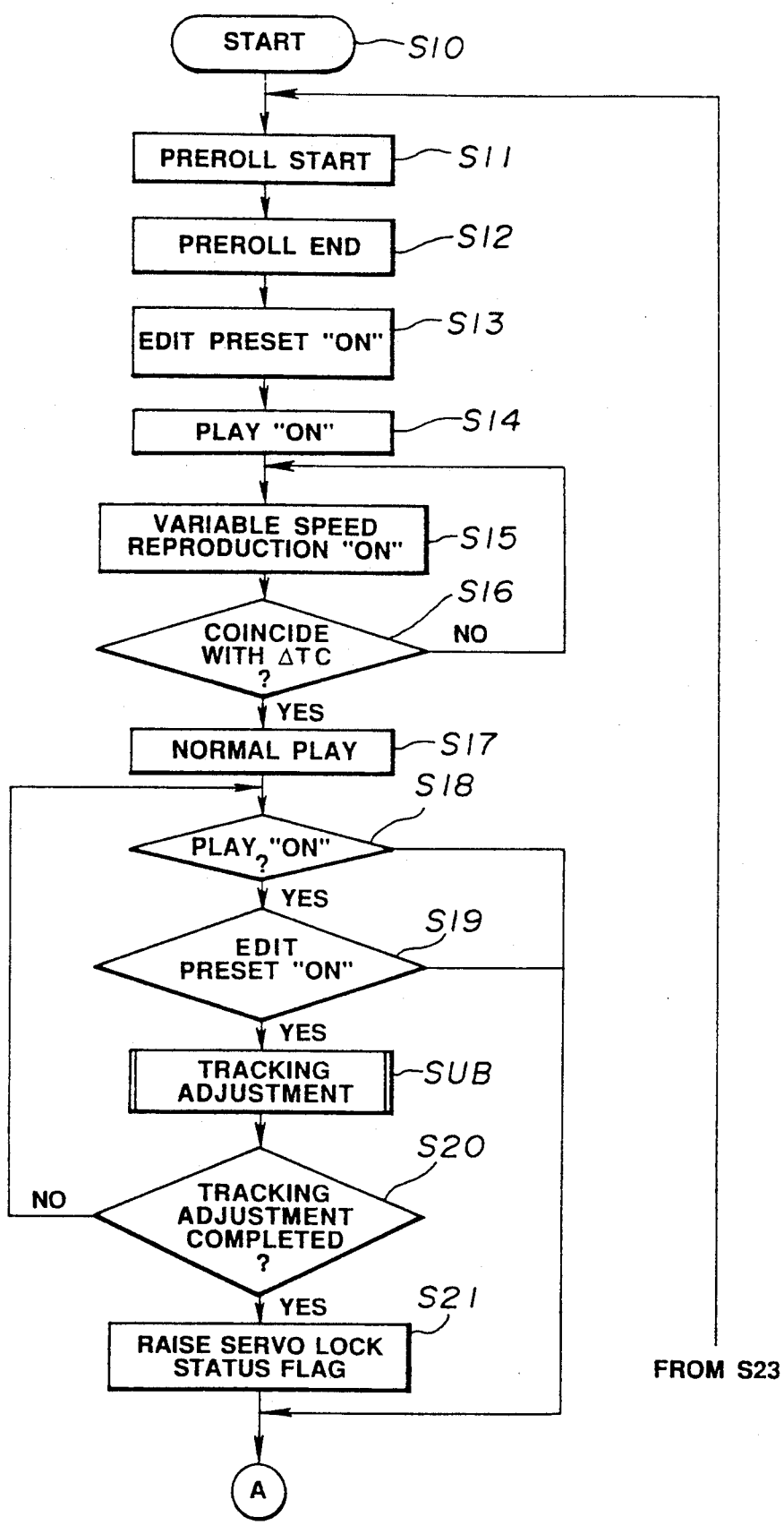
FIGS. 2 and 3 are flowcharts showing algorithm for automatically carrying out editing in this invention.

An embodiment of a tape editing apparatus according to this invention will now be described with reference to FIG. 1 showing the configuration thereof and FIG. 2 showing a flowchart of an algorithm for editing by this tape editing apparatus.

This tape editing apparatus is roughly composed of blocks of a system control system 10 and a servo system 30.

The system control system 10 is controlled on the basis of a control signal delivered from a peripheral equipment 20 externally provided.

The procedure for automatically carrying out tracking adjustment in the time period from the time point of phase adjustment until the start of recording during editing will now be described with reference to FIG. 2.

As shown in FIG. 1, the system control block 10 is comprised of a system controller 11, an operation panel 12, and an input/output interface circuit 13 with the external peripheral equipment 20. This system controller 11 carries out transmission and reception of signals to and from the operation panel 12 and the input/output interface circuit 13.

The flowchart shown in FIG. 2 show the case where an automatic tracking adjustment mode of various modes is designated or selected in the operation panel 12.

In the case of carrying out this automatic tracking adjustment, a control command for carrying out various settings of servo reference select or timer mode select, etc. is first sent, but explanation of this control command is omitted here.

When the automatic tracking adjustment mode is designated or selected, a signal indicating that this mode is selected is delivered from the operation panel 12 to the system controller 11. Namely, in the flowchart shown in FIG. 2, at step S10, tracking adjustment is started in response to inputting of the above signal.

The system controller 11 delivers a control signal to a tape running servo 35 of the servo system 30 in dependency upon selective designation of this mode to start preroll (step S11 shown in FIG. 2).

As shown in FIG. 1, the tape running servo 35 controls a capstan motor 40 through a motor drive amplifier 39. In this case, a preroll control by the tape running servo 35 is conducted such that whether or not a current preroll quantity becomes equal to a set value is judged on the basis of the operating state of the capstan motor 40, e.g., a frequency count value of the capstan motor 40, etc. to carry out a servo control.

The tape running servo 35 carries out the operation in accordance with the frequency count value, etc. to complete the preroll when the preroll quantity reaches a set value, i.e., at the preroll point (step S12).

At step S13 shown in FIG. 2, an Edit Preset command of information required in advance in editing, which is inputted through the operation panel 12, is sent from the system controller 11 to the tape running servo 35.

This Edit Preset command is a command for carrying out designation of channel of Insert, Assemble, Video, Audio A1, A2, etc. inputted in advance through the operation panel 12.

At step S14, a Play command is sent from the system controller 11. By inputting of this command, the recording and reproducing video tape recorder starts a phase adjustment. Thus, the procedure proceeds to step S15.

This phase adjustment is carried out in the servo system 30 as shown in FIG. 1. In order to carry out this phase adjustment, a configuration as described below is adopted.

In the servo system 30, a fixed head 32 reproduces a signal recorded on a control (hereinafter abbreviated as CTL) track provided in a length direction of a tape 31. A reproduced signal from the CTL track is delivered to a CTL reproducing amplifier 33 for amplifying a CTL reproduced signal. The signal thus amplified is sent to a CTL phase detector 34.

This CTL phase detection circuit 34 carries out phase adjustment between respective video tape recorders by the CTL reproduced signal delivered at the field period, and sends an error voltage proportional to deviation of tracking as a CTL phase detection signal to the tape running servo 35.

Further, a rotary head 36 rotated in a helical direction relative to the tape 31 sends a RF envelope signal to a RF envelope detector 37. The output from the RF envelope detector 37 is sent to an A/D converter 38. The output signal of the A/D converter 38 is sent as envelope data used for tracking adjustment to the tape running servo 35. This tape running servo 35 delivers, to a motor drive amplifier 39, a control signal for controlling the capstan motor 40 in dependency upon the CTL phase detection signal and the envelope data. The motor drive amplifier 39 amplifies the control signal for the capstan motor 40 thus delivered to send it to the capstan motor 40 of the reproducing system. By controlling respective circuits of the servo system 30, phase adjustment is carried out.

In actual terms, at step S15, for phase adjustment, e.g., a variable speed reproduction command (Var) for changing the reproducing speed is sent.

In accordance with inputting of this variable speed reproduction command, recognition of time codes (LTC recorded in a length direction, for example) is made. Namely, in order to allow time codes at respective edit points of the tapes for carrying out reproduction and recording to have a fixed relationship, the video tape recorder carries out a variable speed reproduction for a time period up to respective editing points (cut-in points) by inputting ("ON") state of the variable speed reproduction command (Var). In actual terms, when the time code at the editing point of one tape is assumed to be $TC_a$, and the time code at the editing point of the other tape is assumed to be $TC_b$, a variable speed reproduction is conducted so that a difference between time codes obtained from the VTRs (Video Tape Recorders) becomes equal to the difference $\Delta TC$ (e.g., $TC_a - TC_b$) between time codes at the editing points.

After the variable speed reproduction is carried out, the procedure proceeds to step S16.

At this step S16, it is determined whether or not the difference between the time codes is equal to $\Delta TC$. As a result, in the case where a difference between the time codes at respective editing points (cut-in points) of the two video tape recorders is not in correspondence with $\Delta TC$, the procedure returns to step S15 to repeat the variable speed reproduction. On the other hand, in the case where that difference is in correspondence with $\Delta TC$, the procedure proceeds to step S17.

At the step S17, the phase adjustment operation is completed, thus allowing the entirety of the apparatus to be in a normal play state.

After the apparatus is caused to be in a normal state in this way, it starts monitoring the RF envelope of the video signal delivered through the rotary head 36 from the tape 31. Thus, the procedure proceeds to step S18.

At the step S18, whether or not a play command indicating the operation state is in "ON" state is confirmed.

This confirmation is accomplished by determining the operating state of the tape running servo 35. In the case where the play command is not in "ON" state, the procedure shifts to step S22 shown in FIG. 3. On the other hand, in the case where the play command is in "ON" state, the procedure proceeds to step S19.

At the step S19, whether or not the edit preset command indicating the state of the operation mode is in "ON" state is confirmed. In the case where the edit preset command is not in "ON" state, the procedure shifts to step S22 shown in FIG. 3. On the other hand, in the case where the edit preset command is in "ON" state, the procedure proceeds to the subroutine SUB.

By confirming the state of the both commands respectively delivered at the steps S18 and S19, discrimination as to whether or not the tape editing apparatus is in the phase adjustment period is carried out.

After whether or not this apparatus is at a phase adjustment period is discriminated, the procedure proceeds to the step S19.

Then, the procedure proceeds to the subroutine SUB for carrying out tracking adjustment on the basis monitoring of the RF envelope of the video signal.

In the subrouting SUB, adjustment of the tracking of the video tape recorder is carried out. The operation of tracking adjustment is carried out by monitoring the RF envelope of the video signal to automatically adjust the tracking so that the adjustment level takes a maximum value. Thus, the procedure shifts to the next step S20.

At the step S20, whether or not adjustment of the tracking of the video tape recorder is completed is discriminated. Discrimination as to whether or not adjustment of the tracking is completed is accomplished by judging whether or not, e.g., the tracking adjustment level is above a threshold level. In the case where adjustments of tracking of the respective recording and reproducing video tape recorders are not satisfactorily carried out, servo lock status information is sent from the tape running servo 35 back to the system controller 11 with its flag being not rased or set in order to indicate that the system is in an unlock state (is not in a lock state). The procedure returns to the step S18. At this time, a servo flag is actually not raised or set.

On the other hand, in the case where adjustments of tracking of the both video tape recorders are completed, the procedure proceeds to step S21.

At the step S21, servo lock status flag is raised or set at the tape running servo 35. The procedure proceeds to step S22 through a connective A.

As stated above, the tape editing apparatus according to this invention is adapted to automatically carry out tracking adjustment for a time period from the time point when the phase adjustment is carried out until starting of recording, and to send status information indicating that the tape running servo is not in a lock state back to the editing machine in the case where tracking adjustment is not completed by the time recording begins to repeat such an operation until the tracking adjustment is completed. For this purpose, in this apparatus, processing from the steps S17 to S21 are added to those of the conventional apparatus.

Figure 3:
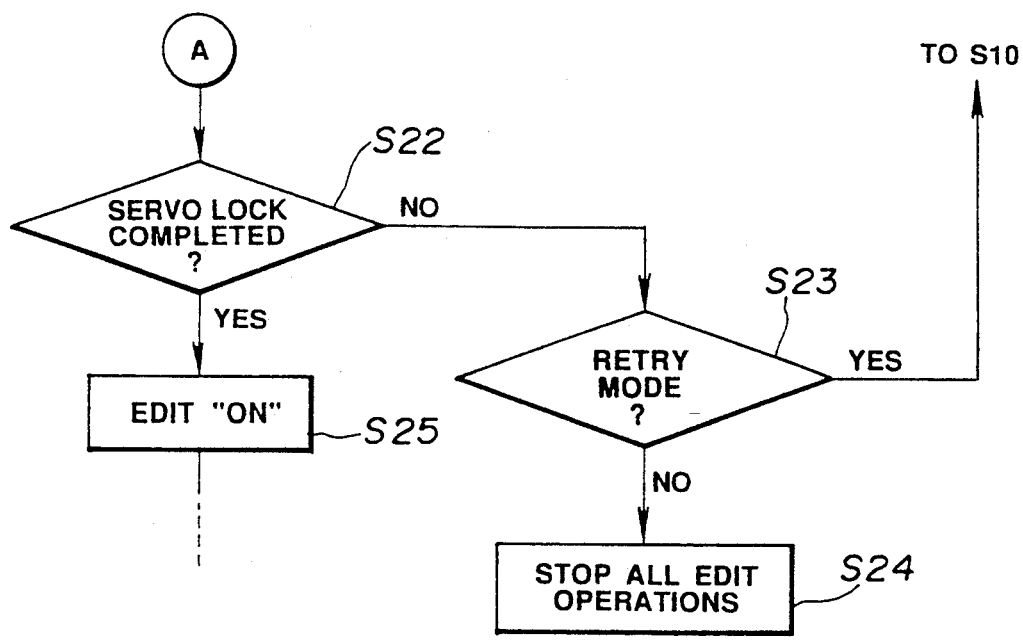

At the step S22 through the connective A shown in FIG. 3, whether or not there results a servo lock is discriminated as the final processing of the editing preprocessing. This discrimination is made by discriminating whether or not the servo lock status flag is set or raised at the tape running servo 35.

When it is discriminated at the tape running servo 35 that the servo lock status flag is not raised or set, the procedure shifts to step S23 to discriminate whether or not the tape editing apparatus is in a rewrite mode.

In the case where it is discriminated at this step S23 that the tape editing apparatus is not in the rewrite mode, the procedure proceeds to step S24 to judge this apparatus that it is in a mode of abort state, thus to stop all editing operations.

On the other hand, when it is discriminated at the step S23 that the tape editing apparatus is in the rewrite mode, the procedure returns to the step S11 to start a automatic editing operation for a second time from the beginning.

Further, when it is judged at the step S22 that the servo lock status flag is set or raised, i.e., adjustment of tracking is completed, the procedure proceeds to step S25. At this step S25, Edit is caused to be placed in "ON" state when the tracking position reaches the editing point (cut-in point) to start editing.

In a manner stated above, subsequent editing work is sequentially automatically carried out.

In this tape editing apparatus, an approach is adopted, in automatically carrying out tracking adjustment from when phase adjustment begins until the start of recording, to send status information notifying the editing machine that the tape running servo 35 is not in a lock state back to the system controller 11 in the case where tracking adjustment is not completed by the time recording begins to repeat such an operation until tracking adjustment is completed, thereby making it possible to eliminate the necessity of manually adjusting tracking prior to the editing work.

Further, the tape editing apparatus is of a structure such that it can be controlled not only by operation panel 12 as described above, but also by external peripheral equipment 20. Namely, as described above, the system control system 10 is provided with input/output interface circuit 13 for carrying out input/output to and from the peripheral equipment 20 externally provided. Accordingly, the peripheral equipment 20 externally provided can control this recording/reproducing apparatus with editing function through the input/output interface circuit 13. For the external peripheral equipment 20, there are, for example, an editing machine, a remote controller, and a computer, etc. This input/output interface circuit 13 for carrying out input/output is connected to the system controller 11.

This control method is a method which has the ability to deliver a control command, in addition to the operation panel 12, from the external peripheral equipment 20 to the system controller 11 through the input/output interface circuit 12 to control the servo system 30. Responding to the control command, status information with respect to the above-mentioned control from the servo system 30 is sent back to the external peripheral equipment through the system controller 11 and the input/output interface circuit 13. The control of the tape editing apparatus by the external peripheral equipment used in this case may employ, in addition to a method responding to various control commands to operate the apparatus on the basis the above-described algorithm, a method of conditionally judging the state of the servo lock status information sent back from the tape running servo 35 of the servo system 30 by the system controller 11 to deliver a command to start the tracking adjustment SUB, thus to automatically carry out tracking. At this time, the state of the servo lock status information may be recognized by the external peripheral equipment 20 through the input/output interface circuit 13.

In this way, the recording/reproducing apparatus with editing function relating to the system for automatically carrying out tracking adjustment automatically carries out tracking adjustment for a time period from the time when phase adjustment is carried out until starting of recording at the time of editing, up to the so-called cut-in point to send status information indicating that the running servo 35 is not in a servo lock state back to the editing machine 20 in the case where tracking adjustment is not completed by the time recording begins, thus to repeatedly and automatically carry out tracking adjustment until adjustment of the tracking is completed at the time of phase adjustment.

What is claimed is:

1. A tape editing apparatus with automatic tracking adjustment, the apparatus comprising:

phase adjustment means, operating during forward tape movement prior to start of recording, for adjusting to a predetermined value phase between a control signal reproduced from a recording tape and a control signal reproduced from a reproducing tape;

tracking adjustment means for automatically carrying out a tracking adjustment in a time period from the time when the phase adjustment has been carried out until the start of recording; and means for providing status information indicating when the tracking adjustment has been completed, and, when the tracking adjustment has not been completed by the start of recording, for causing the phase adjustment means and the tracking adjustment means to repeat their operations until the tracking adjustment is completed.

2. The tape editing apparatus as set forth in claim 1, wherein the tracking adjustment means includes:

means for detecting an RF envelope signal reproduced from each tape, the RF envelope signal having a level; and means for providing servo control of running the respective tape in response to the level of the detected RF envelope signal.

3. The tape editing apparatus as set forth in claim 1, wherein:

the apparatus additionally comprises a capstan motor means for moving each tape in a longitudinal direction; and the phase adjustment means includes:

means for reproducing each control signal from a signal recorded on a control track provided in a length direction of each tape, means for detecting the phase of one of the control signals relative to the other of the control signals to provide a detected signal, and means for controlling the capstan motor means in response to the detected signal.

4. The tape editing apparatus as set forth in claim 1, wherein:

the apparatus additionally includes a tape running servo means for controlling the recording tape, the tape running servo means having a lock state, the lock state of the tape running servo indicates that the apparatus is ready to perform tape editing, and the means for providing status information indicating when the tracking adjustment has been completed provides the status information by indicating that the tape running servo means is in a lock state.

* * * * *